United States Patent [19]

Dietz et al.

[11] Patent Number: 5,088,746
[45] Date of Patent: Feb. 18, 1992

[54] ZERO-DEFLECTION SUPPORT CHUCK

[75] Inventors: Richard A. Dietz, Utica; Robert Laube, Mt. Clemens; Eugene R. Andre, Sr., Huntington Woods, all of Mich.

[73] Assignee: Hydra-Lock Corporation, Warren, Mich.

[21] Appl. No.: 702,584

[22] Filed: May 17, 1991

[51] Int. Cl.$^5$ ............................................. B23B 31/30
[52] U.S. Cl. .................................. 279/4; 24/463; 409/234
[58] Field of Search ............... 279/1 R, 1 ME, 2 A, 279/4; 409/232, 234; 24/463; 373/94, 101

[56] References Cited

U.S. PATENT DOCUMENTS

| | | | |
|---|---|---|---|
| 2,920,895 | 1/1960 | Krouse | 279/4 |
| 3,079,789 | 3/1963 | Dean | 279/4 X |
| 3,592,482 | 7/1971 | Better et al. | 279/4 |

Primary Examiner—Steven C. Bishop
Attorney, Agent, or Firm—Barnes, Kisselle, Raisch, Choate, Whittemore & Hulbert

[57] ABSTRACT

A zero-deflection support chuck is provided for gripping a load shaft which includes a stable support body having a bore, a gripping sleeve closely embracing the load shaft and a pressure sleeve within the bore and surrounding the gripping sleeve. The outer surface of the pressure sleeve is exposed to a pressure medium from a pressure source. The outer surface of the pressure sleeve has sealing lands at each end cooperating with the ends of the bore and a spiral groove and lands extending between the sealing lands. The lands between the grooves have the same diameter as the bore in the body. Pressure in the spiral grooves and the inner surface of the body bore moves the gripping sleeve tightly against the support shaft along the entire length of the sleeves and locks the shaft in a stable position.

4 Claims, 1 Drawing Sheet

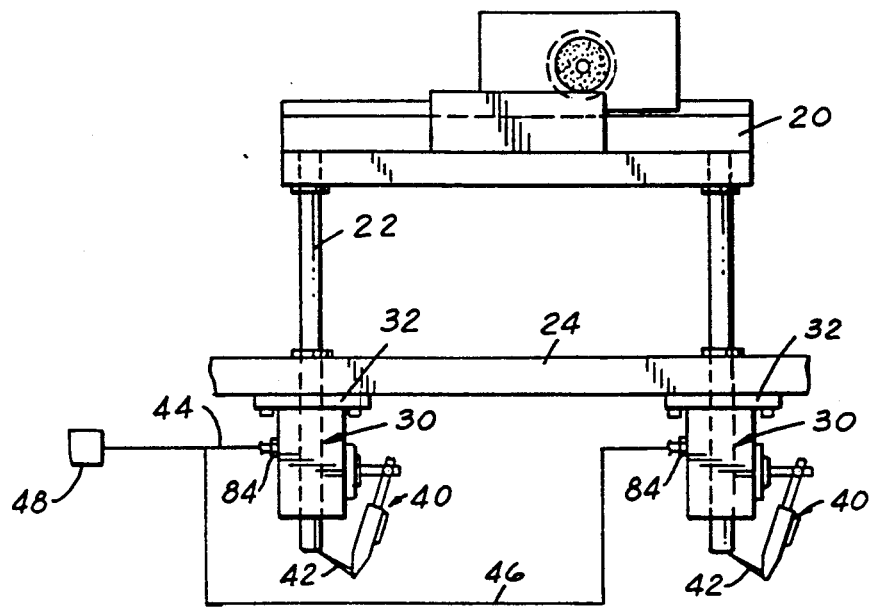
FIG. 1
FIG. 2
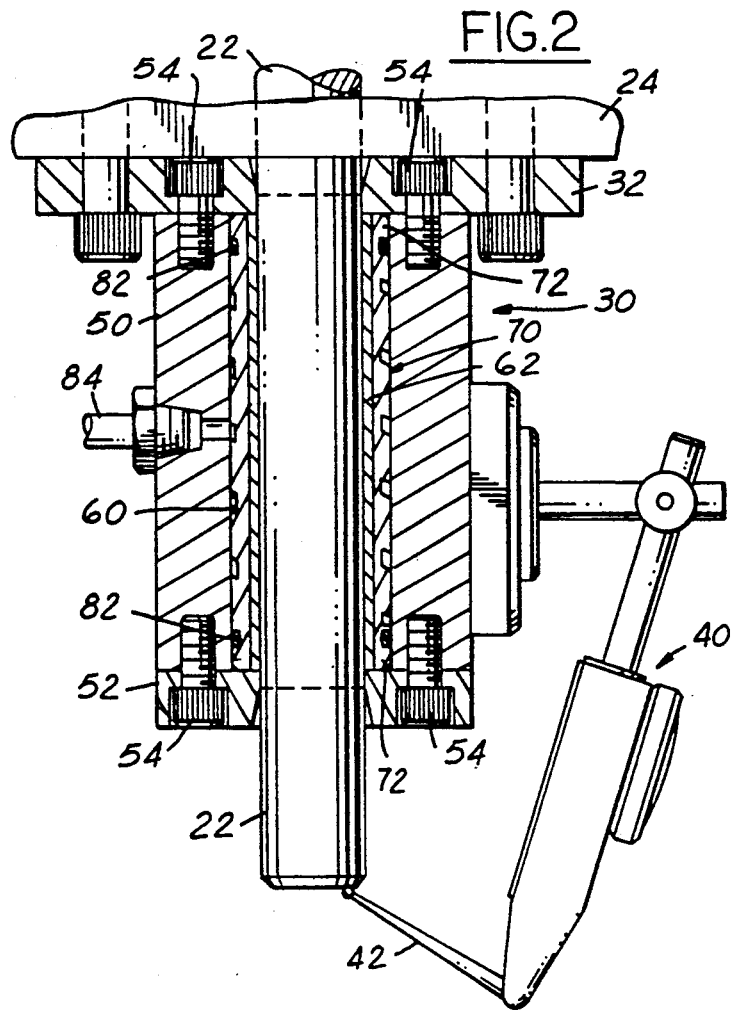
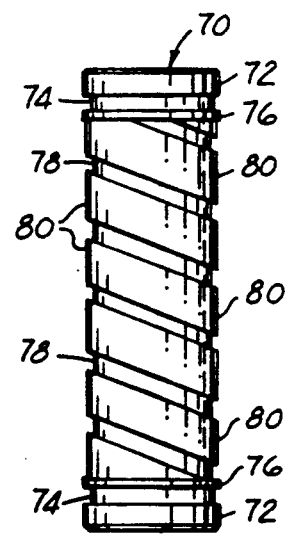
FIG. 3
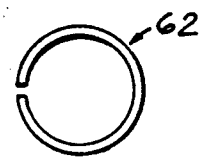
FIG. 4

ZERO-DEFLECTION SUPPORT CHUCK

FIELD OF INVENTION

Pressure holding chucks for arbors and work parts, and particularly holding devices for loads with no deflection under load.

BACKGROUND AND FEATURES OF THE INVENTION

Hydrostatic holding devices have been used for a number of years for holding work parts as illustrated by U.S. Pat. No. 2,744,756 (May 8, 1956) and U.S. Pat. No. 3,677,559 (July 18, 1972). The present invention is directed to an improved holding device which has zero deflection. This type of device can be used for supporting loads which are to be machined or for supporting machines where it is necessary to have zero deflection to maintain accuracy.

The present hydrostatic holding device to be disclosed includes a gripping sleeve with a special exterior sleeve surrounding the gripping sleeve to receive and distribute pressure on the gripping sleeve.

Additional features and objects of the invention will be apparent in the following description and claims in which the invention is described together with the manner of making and using it, all in connection with the best mode presently contemplated for the carrying out of the invention.

BRIEF DESCRIPTION OF THE DRAWINGS

DRAWINGS accompany the disclosure and the various views thereof may be briefly described as:

FIG. 1, a side view of load devices on vertical shaft supports with zero deflection clamps.

FIG. 2, a sectional view of one of the holding assemblies.

FIG. 3, an elevation of a pressure sleeve shown as part of the assembly section of FIG. 2.

FIG. 4, an end view of a gripping sleeve.

BRIEF DESCRIPTION OF THE INVENTION

A zero-deflection hydrostatic gripping assembly has an interior cylinder provided to surround and grip a cylindrical portion of a support. Surrounding the cylinder is a second cylinder having a smooth surface to lie in close contact with the outer surface of the gripping cylinder. The outer surface of the second cylinder has a spiral surface groove contained within a body of the assembly. The lands between the grooves are sized to the inner diameter of the inner surface of the body cavity such that installation into the bore is achievable. A pressure source leads to one end of the spiral grooves which are sealed within the body at each end by a contacting ring grooved to carry a seal.

DETAILED DESCRIPTION OF THE INVENTION AND THb 50889294.002 E MANNER AND PROCESS OF USING IT

With reference to the drawings, FIG. 1 illustrates a load table 20 supported on shafts 22 (two or four). A bottom support bed 24 has zero-deflection chucks 30 bolted to the bottom surface by an attaching plate 32. Gauge devices 40 with a feeler 42 are mounted on the chucks 30. Hydraulic pressure lines 44 and 46 connect the chucks to a pressure source 48.

Turning to FIG. 2, the chuck 30 is an assembly including a body 50 closed at the top end, as depicted in FIG. 2, by the plate 32 and at the bottom end by a cover plate 52 bolted to the body by cap screws 54. The body 50 has an axial cylindrical bore 60 with a smooth finished surface. The mounting bed 24, the attaching plate 32, and the cover plate 52 are provided with a bore to receive the support shafts 22 which projects through these elements.

Within the body 50 and surrounding the shaft 22 is a gripping sleeve 62 which is retained at each end, respectively, by plates 32 and 52. This sleeve 62 has a full length longitudinal split as shown in FIG. 4. Between the inner surface 60 of the body bore and the gripping sleeve 62 is a pressure sleeve 70 shown in isolation in FIG. 3. This sleeve 70 has a smooth inner surface in contact with the gripping sleeve. The body 30, the gripping sleeve 62, and the pressure sleeve 70 are all ground on both ends to the same exact length. This careful dimensioning of these parts eliminates any elongation due to the internal pressure in the pressure sleeve and thus prevents any axial shift due to the internal pressure. The 0-ring seals described below prevents any leakage from the pressure sleeve.

The outer surface of the pressure sleeve 70 is an important and significant feature of the present zero-deflection holder or jack 30. The outer surface of sleeve 70, first of all, has lands 72 at each end outside an O-ring groove 74. Inside the groove is a narrow land 76 with the same outside diameter as land 72. Between the lands 76, the surface of the sleeve 70 is provided with spiral grooves 78 separated by spiral lands 80. The spiral pitch can be ¼" to ½" with ⅛" lands, for example, for an overall sleeve length of 3½". However, any appropriate length can be used depending on shaft size and load to be carried. The lands 80 may have a diameter essentially equal to the inside diameter of the bore 60 in the body 50. Sealing rings, such as O-rings 82, are located in the grooves 74 prior to assembly. Pressure inlet connections 84 are provided in body elements 30 in a conventional way to connect a pressure source to the spiral groove in the pressure sleeve 70.

A load such as 10,000 pounds on the shaft 22 and resisted by the gripping sleeve 62 cannot tend to distort the sleeve due to the tight end clamping described above. Thus, there can be no change in the axial displacement. In addition, the spacing of the spiral grooves 78 and lands 80 insures an equal application of pressure on the gripping sleeve along the entire length. Thus, there is positive gripping of the gripping sleeve on the load shafts 22 which provides zero deflection of the shafts. Practical tests of this assembly has shown that the assembly functions well and as expected. The fluid medium in the system is usually an oil or grease and the pressures produced by the pressure source 46 are in the range of 8,000 p.s.i to 10,000 p.s.i. The body 50, the gripping sleeve 62 and the spiral pressure sleeve are all preferably made from a heat treated alloy steel.

What is claimed is:

1. A zero-deflection gripping device for supporting an axially loaded shaft which comprises:
    (a) a body to be independently supported having an axial bore for receiving a loaded shaft to be gripped,
    (b) a gripping sleeve in said bore of said body to embrace a loaded shaft passing through said bore,
    (c) a pressure sleeve positioned in said bore between the inner surface of said bore and the outer surface of the gripping sleeve, said pressure sleeve having an inner surface to contact said gripping sleeve and an outer surface facing the inside surface of said bore, said outer surface having a spiral groove extending from end to end of said pressure sleeve forming lands between said grooves, (d) land means at the end of said spiral grooves in said pressure sleeve to seal the ends of said pressure sleeve, and (e) means to introduce a pressure medium into said spiral grooves to force said gripping sleeve against a loaded shaft in said body.

2. A zero-deflection gripping dev ce as defined in claim 1 in which end caps are positioned on each end of said bore of said body to retain said gripping sleeve and said pressure sleeve in said bore.

3. A zero-deflection gripping device as defined in claim 1 in which said outer surface of said pressure sleeve has end lands closely fitting in said body bore and an O-ring groove in said end lands to retain an O-ring to seal the ends of said spiral groove.

4. A zero-deflectiongripping device as defined in claim 1 in which annular lands are provided at the ends of said spiral grooves to serve to retain pressure medium in said chamber and exert radial pressure inwardly around the said loaded shaft.

* * * * *